(12) United States Patent
Hale et al.

(10) Patent No.: US 12,409,541 B2
(45) Date of Patent: Sep. 9, 2025

(54) OSCILLATING MULTI-TOOL

(71) Applicant: MILWAUKEE ELECTRIC TOOL CORPORATION, Brookfield, WI (US)

(72) Inventors: Noelle Hale, San Diego, CA (US); Husam M. Altoonisi, Tabuk (SA); Ryan Tarr, Louisville, KY (US); Alec Sanabria, Germantown, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 21 days.

(21) Appl. No.: 17/749,765

(22) Filed: May 20, 2022

(65) Prior Publication Data
US 2022/0388138 A1 Dec. 8, 2022

Related U.S. Application Data

(60) Provisional application No. 63/191,565, filed on May 21, 2021.

(51) Int. Cl.
*B25D 17/24* (2006.01)
*B24B 23/04* (2006.01)
*B24B 41/00* (2006.01)
*B25F 5/00* (2006.01)

(52) U.S. Cl.
CPC .............. *B25D 17/24* (2013.01); *B24B 23/04* (2013.01); *B24B 41/007* (2013.01); *B25F 5/006* (2013.01); *B25D 2217/0092* (2013.01)

(58) Field of Classification Search
CPC ......... B25F 5/006; B25D 17/24; B24B 23/04; B24B 41/007; B25B 21/02
See application file for complete search history.

(56) References Cited

U.S. PATENT DOCUMENTS

| | | | | |
|---|---|---|---|---|
| 7,938,196 B2* | 5/2011 | Fischer | ................... | B25D 17/24 |
| | | | | 173/210 |
| 2010/0236806 A1* | 9/2010 | Heilig | ..................... | B25F 5/006 |
| | | | | 173/217 |
| 2010/0307783 A1* | 12/2010 | Baumann | ................ | B25B 21/02 |
| | | | | 173/162.2 |
| 2020/0149609 A1* | 5/2020 | Zhang | ..................... | B25F 5/025 |
| 2023/0150085 A1* | 5/2023 | Mizutani | ............... | B24B 23/005 |
| | | | | 451/6 |

FOREIGN PATENT DOCUMENTS

| | | |
|---|---|---|
| CN | 207874150 U | 9/2018 |
| EP | 3500405 B1 | 12/2020 |
| WO | 2011000335 A1 | 1/2011 |

OTHER PUBLICATIONS

International Search Report and Written Opinion for Application No. PCT/US2022/030283 dated Sep. 15, 2022 (10 pages).

\* cited by examiner

*Primary Examiner* — Daniel Jeremy Leeds
(74) *Attorney, Agent, or Firm* — Michael Best & Friedrich LLP

(57) ABSTRACT

A power tool includes a housing, a motor that is disposed within the housing and defining a first axis, and a tool holder driven to oscillate about a second axis by the motor. The second axis is perpendicular to the first axis. The power tool also includes a vibration dampening assembly with a counterweight that is configured to reciprocate along a third axis that is perpendicular to both the first axis and the second axis in response to oscillation of the tool holder about the second axis.

19 Claims, 7 Drawing Sheets

OSCILLATING MULTI-TOOL

CROSS REFERENCE TO RELATED APPLICATION

This application claims the benefit of U.S. Provisional Patent Application No. 63/191,565 filed on May 21, 2021, the entire content of which is incorporated herein by reference.

FIELD OF THE INVENTION

The present disclosure relates to power tools, and more particularly to oscillating multi-tools.

BACKGROUND OF THE INVENTION

The present invention relates to power tools driven by an electric motor. Power tools utilize the rotation of a motor to provide useful torque for operations such as cutting, sanding, grinding, removing material, drilling, driving fasteners, and the like. One example of a power tool is an oscillating multi-tool. Oscillating multi-tools can be utilized with various accessories, such as blades and sanding or grinding pad attachments, for performing different functions.

SUMMARY OF THE INVENTION

The present invention provides, in one aspect, a power tool including a housing, a motor that is disposed within the housing and defining a first axis, and a tool holder driven to oscillate about a second axis by the motor. The second axis is perpendicular to the first axis. The power tool also includes a vibration dampening assembly with a counterweight that is configured to reciprocate along a third axis that is perpendicular to both the first axis and the second axis in response to oscillation of the tool holder about the second axis.

In another aspect, the vibration dampening assembly further includes a first spring adjacent a first end of the counterweight and a second spring adjacent an opposite, second end of the counterweight. The first and second springs bias the counterweight toward a neutral position.

In another aspect, the vibration dampening assembly further includes a case in which the counterweight is located.

In a further aspect, the case is internally located within the housing or externally located of the housing.

In another aspect, the case includes a ventilation port configured to communicate an interior of the case in which the counterweight is located with the atmosphere outside the case.

The invention provides, in another aspect, a power tool including a housing, a motor disposed within the housing and defining a first axis, and a tool holder driven to oscillate about a second axis by the motor. The second axis being perpendicular to the first axis. The power tool also includes a drive mechanism configured to convert torque from the motor to an oscillating movement of a tool accessory received by the tool holder and a vibration dampening assembly including a counterweight configured to reciprocate along a third axis perpendicular to both the first axis and the second axis in response to oscillation of the tool holder about the second axis.

The invention provides, in another aspect, a power tool including a housing, a motor disposed within the housing and defining a first axis, and a tool holder driven to oscillate about a second axis by the motor. The second axis being perpendicular to the first axis. The power tool also includes a vibration dampening assembly having a case supported by the housing and a counterweight positioned within the case. The counterweight is configured to reciprocate along a third axis perpendicular to both the first axis and the second axis in response to oscillation of the tool holder about the second axis. The vibration dampening assembly also includes a first spring arranged between the case and the counterweight and a second spring arranged between the case and the counterweight. The first spring biases the counterweight in a first direction and the second spring biases the counterweight in a second direction opposite the first direction. The first and second springs bias the counterweight toward a neutral position within the case.

Before any embodiments of the disclosure are explained in detail, it is to be understood that the disclosure is not limited in its application to the details of construction and the arrangement of components set forth in the following description or illustrated in the following drawings. Also, it is to be understood that the phraseology and terminology used herein is for the purpose of description and should not be regarded as limiting.

DETAILED DESCRIPTION

Figure 1:
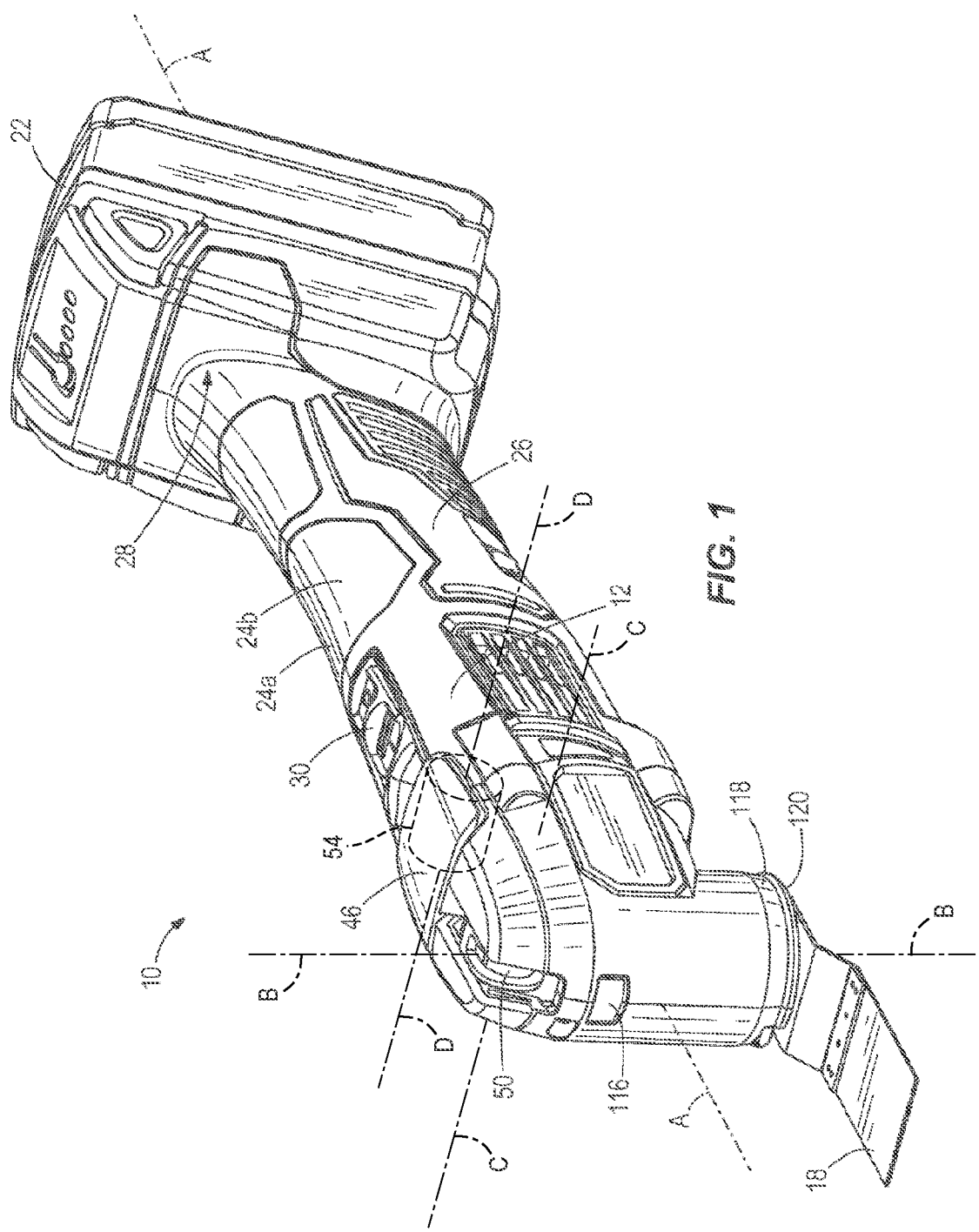
FIG. 1 is a top perspective view of an oscillating multi-tool in accordance with an embodiment of the invention.
Figure 2:
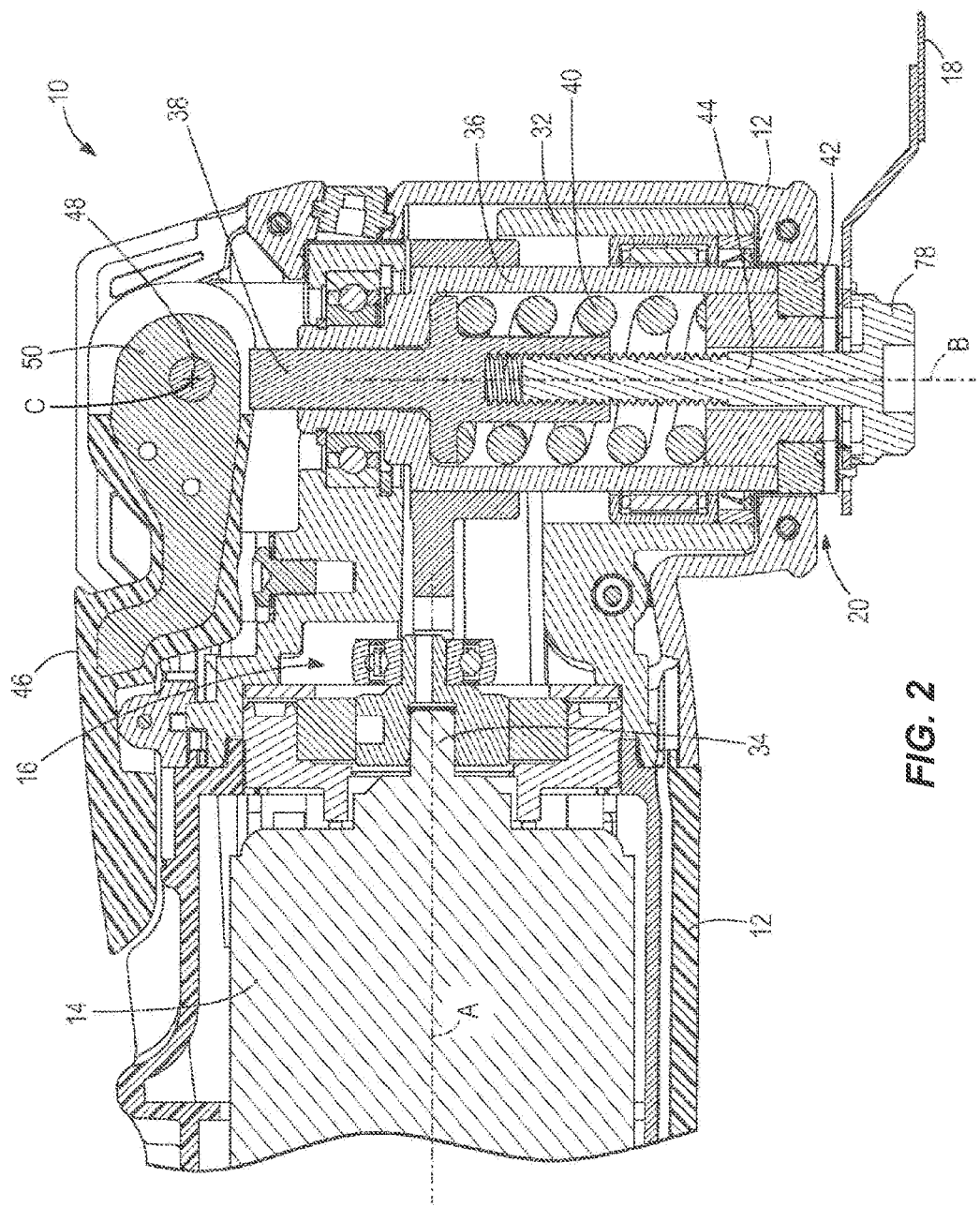
FIG. 2 is a cross-sectional view of a portion of the multi-tool shown in FIG. 1.

FIGS. 1 and 2 illustrate a power tool, such as an oscillating multi-tool 10, including a housing 12, a motor 14, a drive mechanism 16 that converts torque received from the motor 14 to an oscillating movement of a tool accessory 18 about an axis B, and a power source, such as a battery pack 22, for powering the motor 14. In some embodiments, the multi-tool 10 may be powered by an AC power source by way of a cord (not shown).

With reference to FIG. 1, the housing 12 includes two clamshell halves 24a, 24b that are coupled together to enclose the motor 14 and the drive mechanism 16. When connected, the clamshell halves 24a, 24b define a handle portion 26 and a battery support portion 28 of the housing 12 to which the battery pack 22 is attached. The handle portion 26 is configured to be grasped by a user during operation of the power tool 10. An actuator 30 is located on the handle portion 26 of the housing 12 for switching the motor 14 between an "on" state and an "off" state. In some embodiments, a separate actuator may be employed for changing the rotational speed of the motor 14. In other embodiments, the actuator 30 may additionally be operable to vary the rotational speed of the motor 14 in addition to switching the motor 14 between the "on" and "off" states.

The motor 14 and the drive mechanism 16 are positioned within the housing 12 in front of the handle portion 26. In the illustrated embodiment, the drive mechanism 16 is positioned within a gear case 32 attached to the housing 12 (FIG. 2). The motor 14 includes a drive shaft 34, which provides a continuous torque input to the drive mechanism 16 when the motor 14 is in the "on" state. The drive mechanism 16 converts the continuous torque input from the drive shaft 34 into oscillating rotational motion of the tool accessory 18 about the axis B.

The tool accessory 18 is coupled to an output shaft, or spindle 36, of the drive mechanism 16. In the illustrated embodiment, the spindle 36 defines the axis B, which is perpendicular to a longitudinal axis A defined by the housing 12 and the motor 14 (FIG. 2). When in the "on" state, the motor 14 drives the drive mechanism 16 to oscillate the spindle 36 and the tool accessory 18 about the axis B. In the illustrated embodiment, the tool accessory 18 is a cutting blade. However, in other embodiments, the tool accessory 18 may be a different type of blade such as a scraper blade, a circular blade, a semi-circular blade, etc., or a different type of element such as a sanding pad, a grinding element, etc.

With continued reference to FIG. 2, the multi-tool 10 includes a clamping mechanism 20 for securing the tool accessory 18 to the spindle 36. In the illustrated embodiment, the clamping mechanism 20 does not require the use of tools to attach, remove, and exchange tool accessories. The clamping mechanism 20 includes a plunger 38, a spring 40, a tool holder 42 coupled for co-rotation with the spindle 36, and a fastener 44, which will be described in greater detail below. A lever 46 is pivotable by a user to operate the clamping mechanism 20.

The lever 46 is pivotable about a pin 48, which defines a pivot axis C, between a clamping position (FIG. 2) and a release position (not shown). In the clamping position, the tool accessory 18 is secured, or clamped, to the tool holder 42. In the release position, the fastener 44 may be unthreaded from the plunger 38 to remove and/or exchange the tool accessory 18. The lever 46 includes a cam 50 for displacing the plunger 38. In the clamping position, the cam 50 does not engage the plunger 38. In the release position, the cam 50 engages the plunger 38 to displace the plunger 38 against the bias of the spring 40. A user may rotate the lever 46 about the pivot axis C, causing the cam 50 to engage and displace the plunger 38, which releases the clamping force applied to the tool accessory 18 and allows the fastener 44 and the tool accessory 18 to be removed. A user may then exchange the tool accessory 18 and thread the fastener 44 into the plunger 38 so that the tool accessory 18 reengages the tool holder 42. Once the fastener 44 is repositioned, a user can rotate the lever 46 back to the clamping position, permitting the spring 40 to rebound and displace the plunger 38 and the connected fastener 44 toward the pivot axis C, which applies a clamping force between the tool holder 42 and the tool accessory 18.

Figure 3:
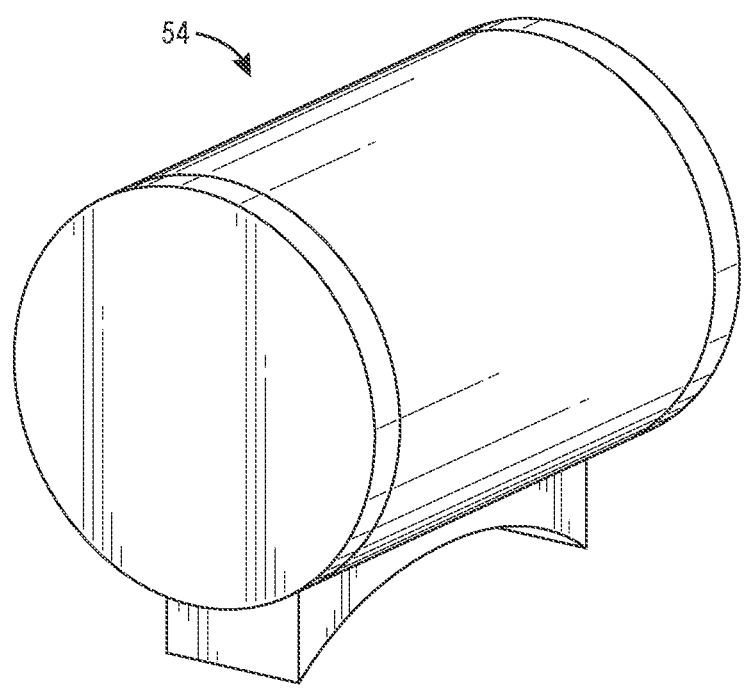
FIG. 3 is a perspective view of a vibration dampening assembly for use with the multi-tool of FIG. 1.
Figure 4:
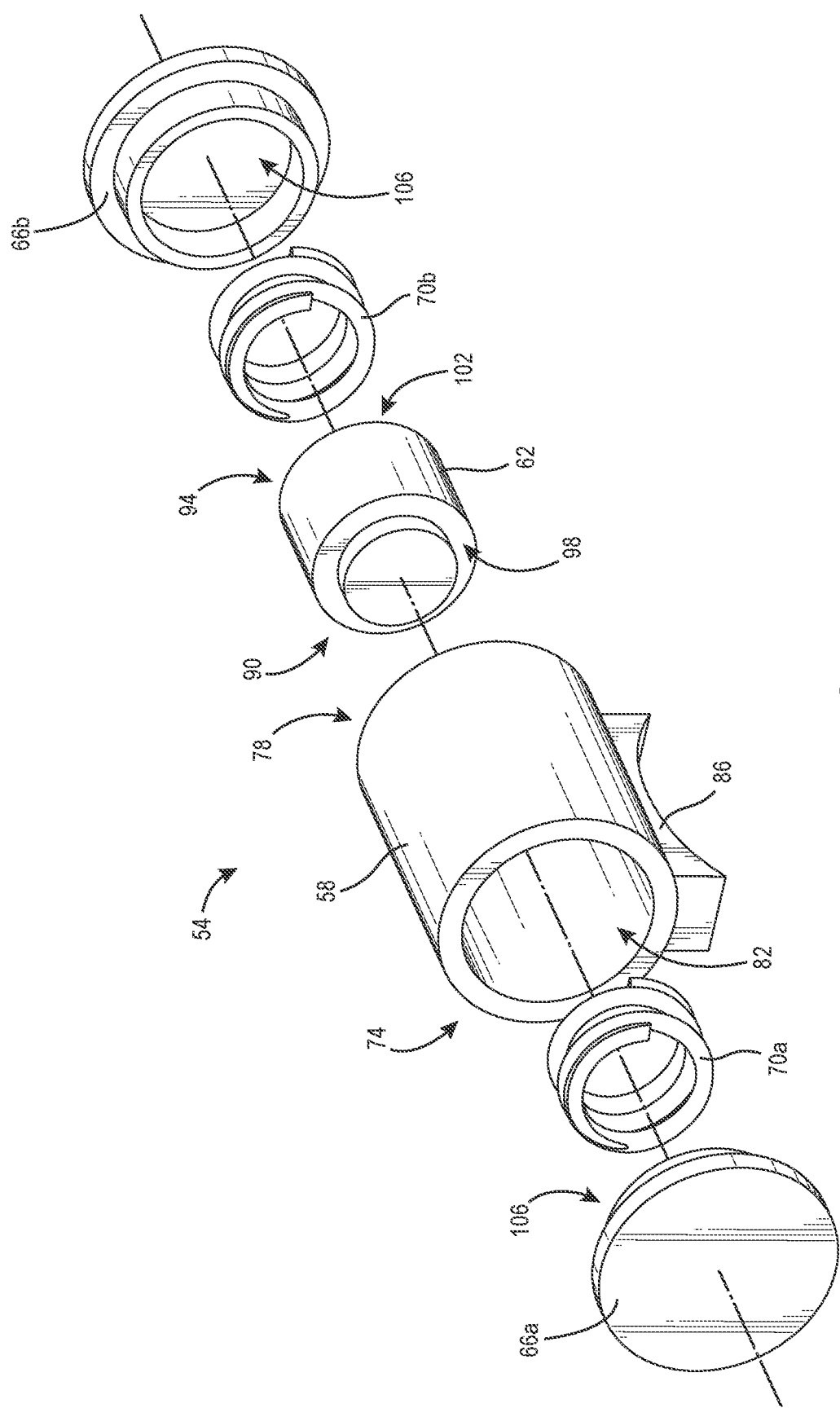
FIG. 4 is an exploded view of the vibration dampening assembly of FIG. 3.
Figure 5:
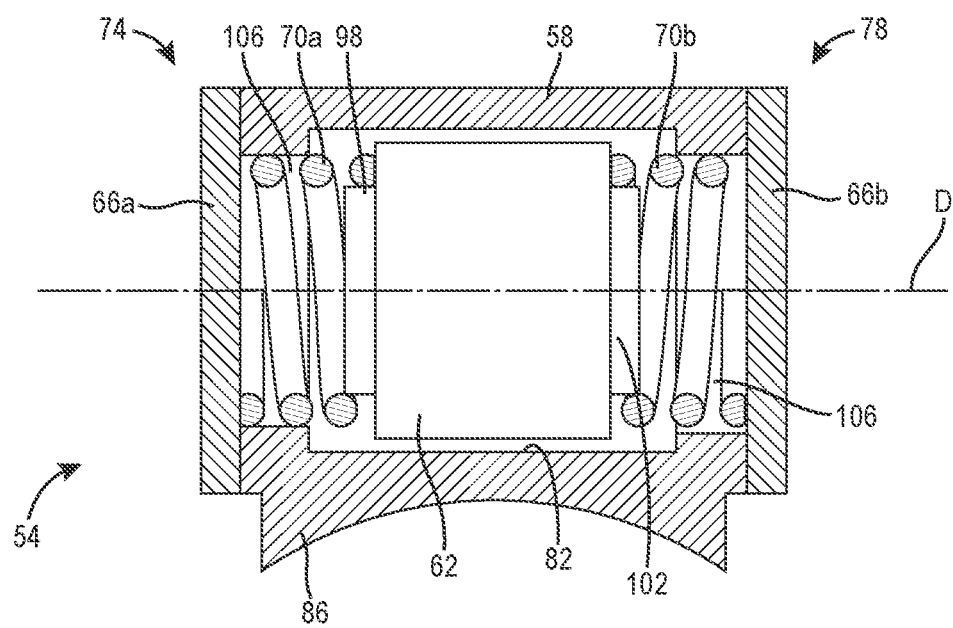
FIG. 5 is a cross-sectional view of the vibration dampening module of FIG. 3.

FIGS. 3-5 illustrate a vibration dampening assembly 54 for use with the multi-tool 10. The vibration dampening assembly 54 attenuates vibration created by the multi-tool 10 during operation. In some embodiments, the vibration dampening assembly 54 may be coupled to the housing 12 with a hose clamp, fasteners, or an adhesive. In other embodiments, the vibration dampening assembly 54 may be integrated with the housing 12. As such, the vibration dampening assembly 54 may be coupled to the exterior of the housing 12. In further embodiments, the vibration dampening assembly 54 may be disposed within the interior of the housing 12. For example, the vibration dampening assembly 54 may be supported within the gear case 32.

As shown in FIGS. 4 and 5, the vibration dampening assembly 54 includes a case 58, a counterweight 62 disposed within the case 58, two end caps 66a, 66b, and two compression springs 70a, 70b positioned on opposite sides of the counterweight 62. The case 58 is generally cylindrical and includes a first end 74 and a second end 78 opposite the first end 74. The case 58 defines a bore 82 that extends between the first and second ends 74, 78. The case 58 also includes a bracket 86 that may be used to mount the vibration dampening assembly 54 to the housing 12. Alternatively, in some embodiments, the case 58 may be integrally formed with the clamshell halves 24a, 24b or omitted entirely with the counterweight 62 being suspended within the housing 12. In some embodiments, the case 58, end caps 66a, 66b, and/or the counterweight 62 may be produced using an additive manufacturing process, such as 3D printing, and may be made from plastic, metal, or other suitable materials.

With continued reference to FIG. 4, the counterweight 62 is also generally cylindrical and defines a first end 90 and a second end 94 opposite the first end 90. The first end 90 of the counterweight 62 defines a first spring seat 98 to receive an end of the spring 70a and the second end 94 defines a second spring seat 102 to receive an end of the other spring 70b. A first end cap 66a is coupled to the first end 74 of the case 58 and a second end cap 66b is coupled to the second end 78 of the case 58. As such, the first and second end caps 66a, 66b enclose the counterweight 62 and springs 70 within the bore 82 of the case 58. Each end cap 66a, 66b includes a spring seat 106 that receives an end of one of the springs 70a, 70b. In some embodiments, one of the end caps 66a, 66b may be integrated with the case 58.

With reference to FIG. 5, the first spring 70a is positioned between the spring seat 106 of the first end cap 66a and the first spring seat 98 of the counterweight 62. The second spring 70b is positioned between the spring seat 106 of the second end cap 66b and the second spring seat 102 of the counterweight 62. The counterweight 62 reciprocates along an axis D, which is perpendicular to both of the axes A, B. In addition, the axis D is parallel with the pivot axis C.

The first spring 70a biases the counterweight 62 in a first direction, whereas the second spring 70b biases the counterweight 62 in a second direction that is opposite the first direction. The first and second springs 70a, 70b have identical stiffnesses; therefore, the counterweight 62 is biased towards a neutral position between the end caps 66a, 66b when the motor 14 is in the "off" state and the tool accessory 18 is not oscillating. The first and second springs 70a, 70b suspend the counterweight 62 within the bore 82 so that the counterweight 62 can freely oscillate within the bore 82 without frictional contact with the interior of the case 58. In addition, the counterweight 62 includes a smaller diameter than the bore 82 of the case 58 to inhibit the counterweight 62 from contacting the case 58. The mass of the counterweight 62 and the stiffness of the springs 70a, 70b can be selected (i.e., tuned) to substantially dampen the vibration created by the oscillating movement of the drive mechanism 16 and the tool accessory 18 when the motor 14 is in the "on" state. In further embodiments, the vibration dampening assembly 54 may include more than two springs.

During operation of the multi-tool 10, in response to the drive mechanism 16 and the tool accessory 18 being oscillated by the motor 14, vibration is created and translated to the operator through the housing 12 and handle portion 26. However, the vibration dampening assembly 54 attenuates this vibration. Specifically, the drive mechanism 16 converts a continuous torque input from the motor 14 to oscillating rotation of the drive mechanism 16 and tool accessory 18 about the axis B. As torque is applied to the spindle 36, the tool holder 42, and the tool accessory 18 to incrementally rotate them about the axis B in a first rotational direction, a reaction torque is applied to the housing 12 in an opposite, second rotational direction about axis B. The spindle 36, the tool holder 42, and the tool accessory 18 then stop rotating in the first rotational direction, and their rotation is reversed to the second rotational direction. As the spindle 36, the tool holder 42, and the tool accessory 18 are rotated in the second rotational direction, a reaction torque is applied to the housing 12 in the first rotational direction about axis B. The oscillating reaction torque applied to the housing 12 creates the vibration felt by the user.

The vibration dampening assembly 54 is offset from the axis B, with the reciprocating axis D of the counterweight 62 oriented transverse to the axis B, to create equal and opposite moments about the axis B to counteract the reversing reaction torque applied to the housing 12. As such, the counterweight 62 reciprocates along the axis D out of phase with the oscillation of the drive mechanism 16 and the tool accessory 18 to counteract the reversing reaction torque. The springs 70a, 70b of the vibration dampening assembly 54 continually bias the counterweight 62 toward a neutral position. The reciprocating movement of the counterweight 62 reduces the magnitude of the vibration transmitted through the housing 12 and handle portion 26 to the user as the spindle 36, the tool holder 42, and the tool accessory 18 oscillate.

Figure 6:
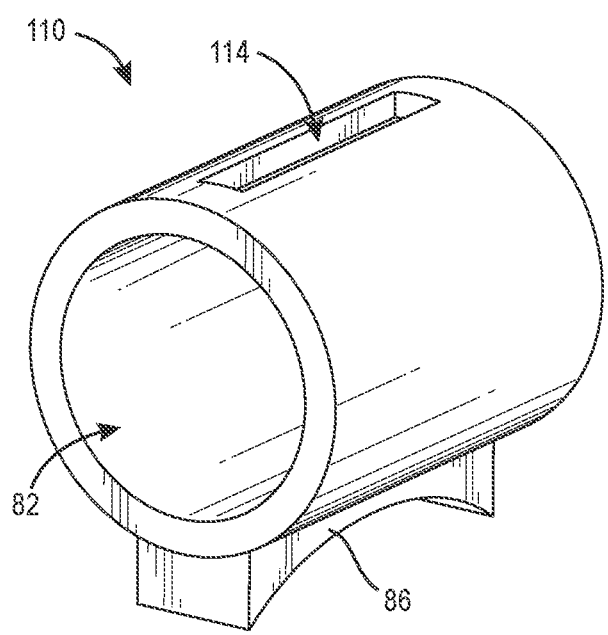
FIG. 6 is a perspective view of a case of another embodiment of the vibration dampening assembly of FIG. 3.

FIG. 6 illustrates a case 110 of a vibration dampening assembly in accordance with another embodiment. The case 110 is similar to the case 58 but includes a slot 114 that extends into the bore 82. The slot 114 ventilates the interior of the case 110 to prevent accumulated air pressure from affecting reciprocation of the counterweight 62.

Figure 7:
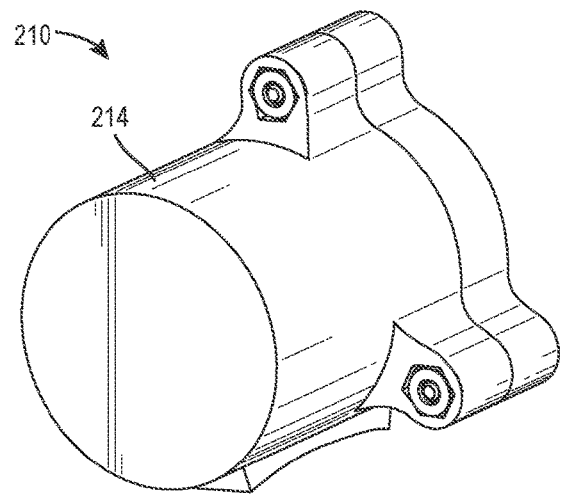
FIG. 7 is a perspective view of another embodiment of a vibration dampening assembly for use with the multi-tool of FIG. 1.
Figure 8:
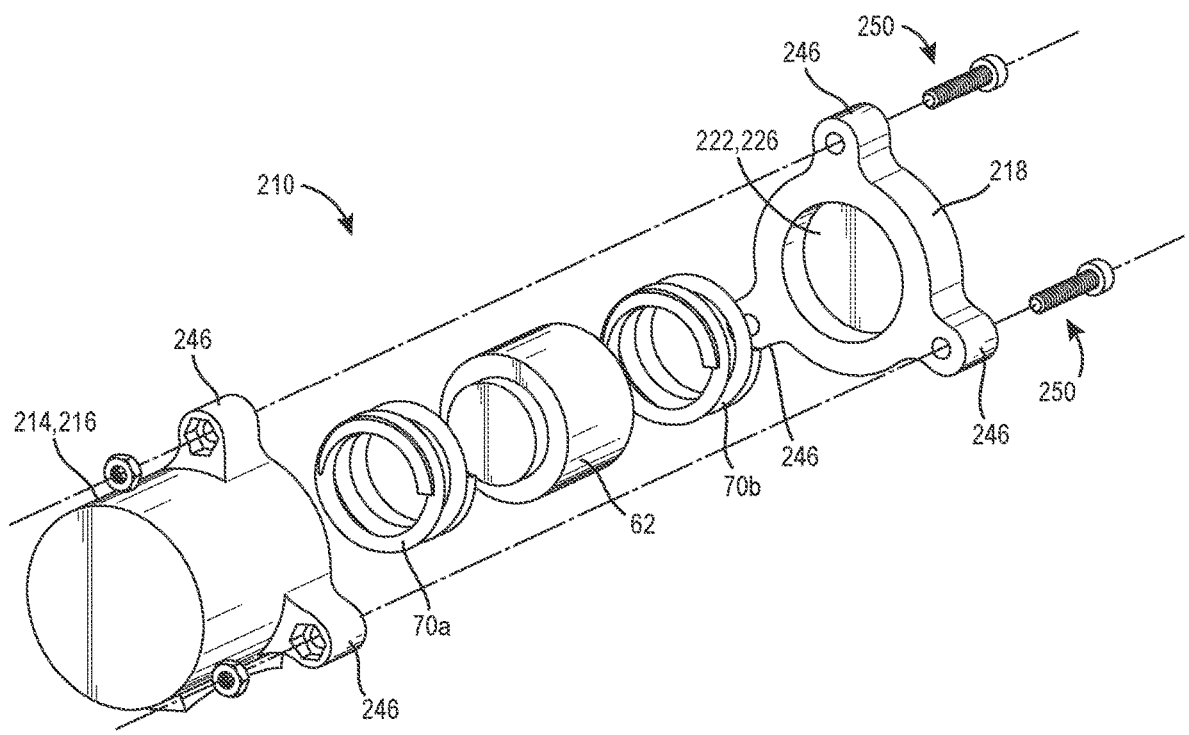
FIG. 8 is an exploded view of the vibration dampening assembly of FIG. 7.
Figure 9:
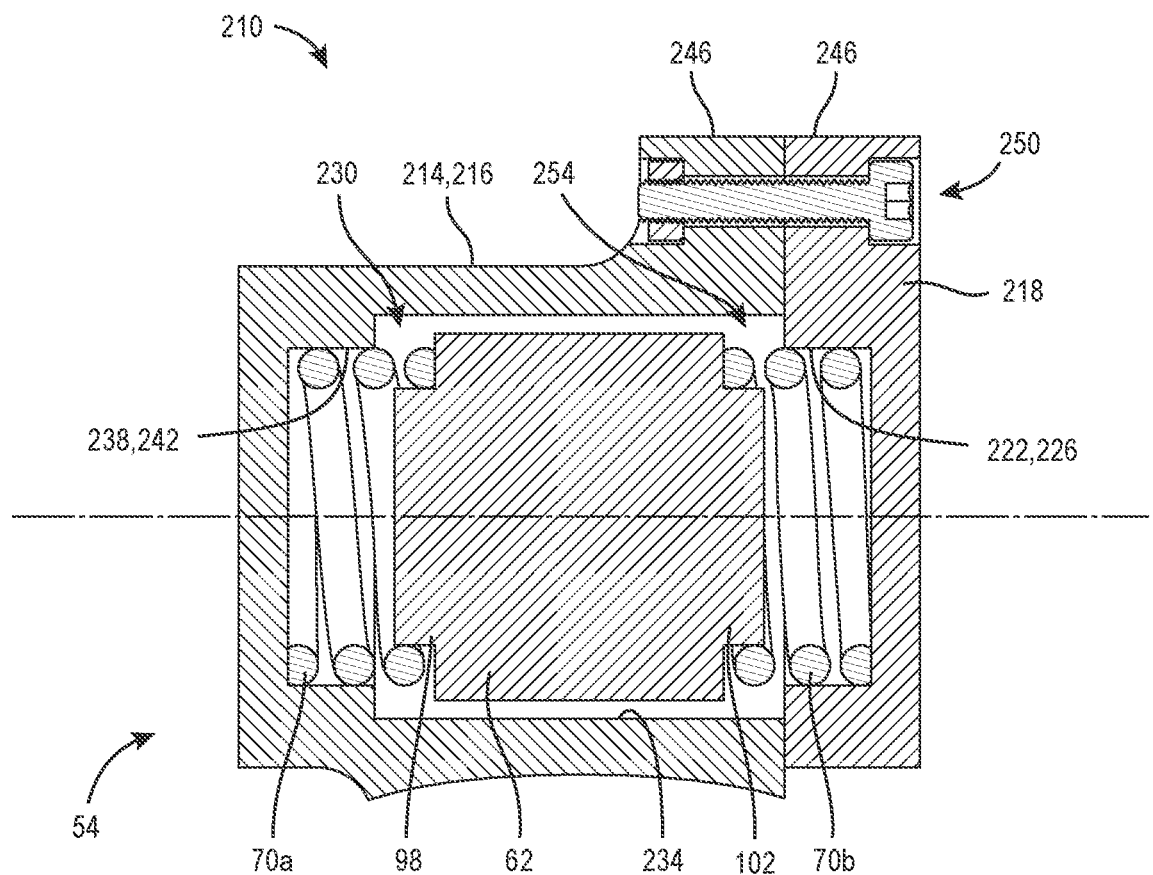
FIG. 9 is a cross-sectional view of the vibration dampening assembly of FIG. 7.

FIGS. 7-9 illustrate a vibration dampening assembly 210, in accordance with another embodiment of the invention, for use with the multi-tool 10 of FIG. 1. The vibration dampening assembly 210 is similar to the vibration dampening assembly 54 with like features being represented with like references numerals. The vibration dampening assembly 210 includes a case 214, a counterweight 62, and first and second springs 70a, 70b (FIGS. 8 and 9).

With continued reference to FIGS. 8 and 9, the case 214 includes an end cap 216 and a flange 218. The flange 218 includes an indentation 222 that defines a spring seat 226 for the second spring 70b. The end cap 216 includes an interior 230 (FIG. 9) having a first cavity portion 234 and a second cavity portion 238 that has a smaller diameter than the first cavity portion 234. The second cavity portion 238 defines a spring seat 242 for the first spring 70a. Both the end cap 216 and the flange 218 include a plurality of bosses 246 extending from respective outer surfaces. A fastener 250 may be inserted through apertures in the bosses 246 to secure the end cap 216 to the flange 218. In the illustrated embodiment, the fasteners 250 include a threaded bolt and a nut. In other embodiments, different types of fasteners may be used.

With reference to FIG. 9, when assembled, the case 214 defines an enclosed chamber 254 in which the counterweight 62 and the springs 70a, 70b are located. The first spring 70a is positioned between the spring seat 242 of the flange 218 and the first spring seat 98 of the counterweight 62. The second spring 70b is positioned between the spring seat 226 of the end cap 216 and the second spring seat 102 of the counterweight 62. Similar to the vibration dampening assembly 54, the first spring 70a biases the counterweight 62 in a first direction, whereas the second spring 70b biases the counterweight 62 in a second direction that is opposite the first direction. The first and second springs 70a, 70b have identical stiffnesses; therefore, the counterweight 62 is biased towards a neutral position between the spring seats 226, 242 when the motor 14 is in the "off" state. The first and second springs 70a, 70b suspend the counterweight 62 within the second cavity portion 238 of the case 214 so that the counterweight 62 can freely oscillate within the second cavity portion 238 without frictional contact with the interior of the case 214. In addition, the counterweight 62 includes a smaller diameter than the second cavity portion 238 to inhibit the counterweight 62 from contacting the case 214.

During operation of the power tool 10, in response to the tool accessory 18 being oscillated by the motor 14, vibration throughout the power tool 10 is generated and translated to the operator through the housing 12 and handle portion 26. However, the vibration dampening assembly 210 attenuates this vibration. Specifically, the drive mechanism 16 converts a continuous torque input from the motor 14 to oscillating rotation of the drive mechanism 16 and the tool accessory 18 about the axis B. As torque is applied to the spindle 36, the tool holder 42, and the tool accessory 18 to incrementally rotate them about the axis B in a first rotational direction, a reaction torque is applied to the housing 12 in an opposite, second rotational direction about axis B. The spindle 36, the tool holder 42, and the tool accessory 18 then stop rotating in the first rotational direction, and their rotation is reversed to the second rotational direction. As the spindle 36, the tool holder 42, and the tool accessory 18 are rotated in the second rotational direction, a reaction torque is applied to the housing 12 in the first rotational direction about axis B. The oscillating reaction torque applied to the housing 12 creates the vibration felt by the user.

The vibration dampening assembly 210 is offset from the axis B, with the reciprocating axis D of the counterweight 62 oriented transverse to the axis B, to create equal and opposite moments about the axis B to counteract the reversing reaction torque applied to the housing 12. As such, the counterweight 62 reciprocates along the axis D out of phase with the oscillation of the drive mechanism 16 and the tool accessory 18 to counteract the reversing reaction torque. The springs 70a, 70b of the vibration dampening assembly 210 continually bias the counterweight 62 toward a neutral position. The reciprocating movement of the counterweight 62 reduces the magnitude of the vibration transmitted through the housing 12 and handle portion 26 to the user as the spindle 36, the tool holder 42, and the tool accessory 18 oscillate.

Various features and advantages are set forth in the following claims.

What is claimed is:
1. A power tool comprising:
a housing;
a motor disposed within the housing and defining a first axis;
a tool holder driven to oscillate about a second axis by the motor, the second axis being perpendicular to the first axis;
a drive mechanism configured to convert continuous torque from the motor to continuous oscillating movement of a tool accessory received by the tool holder; and a vibration dampening assembly disposed in an interior of the housing, the vibration dampening assembly including a counterweight configured to reciprocate linearly along a third axis perpendicular to both the first axis and the second axis in response to oscillation of the tool holder about the second axis, the third axis being positioned above the first axis defined by the motor.

2. The power tool of claim 1, wherein the vibration dampening assembly further includes,
   a first spring adjacent a first end of the counterweight, and
   a second spring adjacent an opposite, second end of the counterweight, and
   wherein the first and second springs are coaxial with the third axis and bias the counterweight toward a neutral position.

3. The power tool of claim 2, wherein the first end of the counterweight defines a first spring seat to receive the first spring and the second end of the counterweight defines a second spring seat to receive the second spring.

4. The power tool of claim 1, wherein the vibration dampening assembly further includes a case in which the counterweight is positioned.

5. The power tool of claim 4, wherein the case includes a ventilation port configured to communicate an interior of the case in which the counterweight is located with the atmosphere outside the case.

6. The power tool of claim 4, wherein the counterweight is enclosed within the case.

7. The power tool of claim 4, wherein the case includes a bracket configured to mount the vibration dampening assembly to the interior of the housing.

8. The power tool of claim 1, wherein the counterweight is produced using an additive manufacturing process.

9. The power tool of claim 1, wherein the counterweight is cylindrical.

10. The power tool of claim 1, wherein the housing defines a battery support portion configured to receive a battery pack to power the motor.

11. The power tool of claim 10, wherein the battery support portion is positioned at a first end of the housing and the drive mechanism is positioned at a second end opposite the first end.

12. The power tool of claim 1, wherein the housing defines a handle portion configured to be grasped by a user, and wherein the motor and the drive mechanism are positioned within the housing in front of the handle portion.

13. A power tool comprising:
   a housing;
   a motor disposed within the housing and defining a first axis;
   a tool holder driven to oscillate about a second axis by the motor, the second axis being perpendicular to the first axis;
   a drive mechanism configured to convert continuous torque from the motor to continuous oscillating movement of a tool accessory received by the tool holder; and
   a vibration dampening assembly disposed in an interior of the housing, the vibration dampening assembly including,
      a case supported by the housing,
      a counterweight positioned within the case, the counterweight configured to reciprocate linearly along a third axis perpendicular to both the first axis and the second axis in response to oscillation of the tool holder about the second axis, the third axis being positioned above the first axis defined by the motor,
      a first spring arranged between the case and the counterweight, the first spring biasing the counterweight in a first direction, and
      a second spring arranged between the case and the counterweight, the second spring biasing the counterweight in a second direction opposite the first direction;
   wherein the first and second springs are coaxial with the third axis and bias the counterweight toward a neutral position within the case.

14. The power tool of claim 13, wherein a first end of the counterweight defines a first spring seat to receive the first spring and a second end of the counterweight opposite the first end defines a second spring seat to receive the second spring.

15. The power tool of claim 13, wherein the vibration dampening assembly further includes a first end cap positioned adjacent a first side of the case and a second end cap positioned adjacent a second side of the case opposite the first side, the first and second end caps enclosing the counterweight within the case.

16. The power tool of claim 13, wherein the counterweight is cylindrical.

17. The power tool of claim 13, wherein the case includes a ventilation port configured to communicate an interior of the case in which the counterweight is located with the atmosphere outside the case.

18. The power tool of claim 13, wherein the case includes a bracket configured to mount the vibration dampening assembly to the interior of the housing.

19. The power tool of claim 1, wherein the counterweight is configured to reciprocate solely along the third axis.

* * * * *